UNITED STATES PATENT OFFICE.

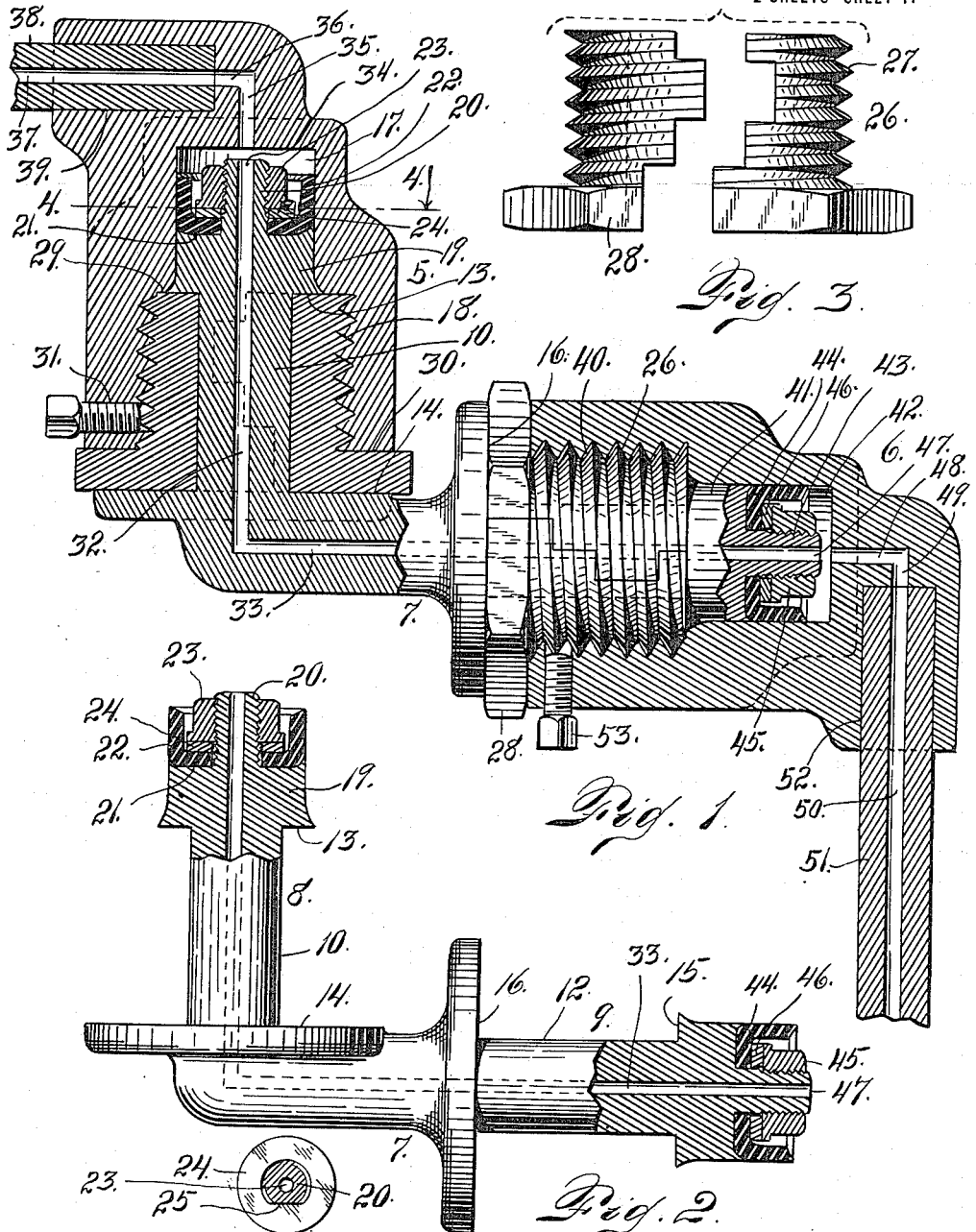

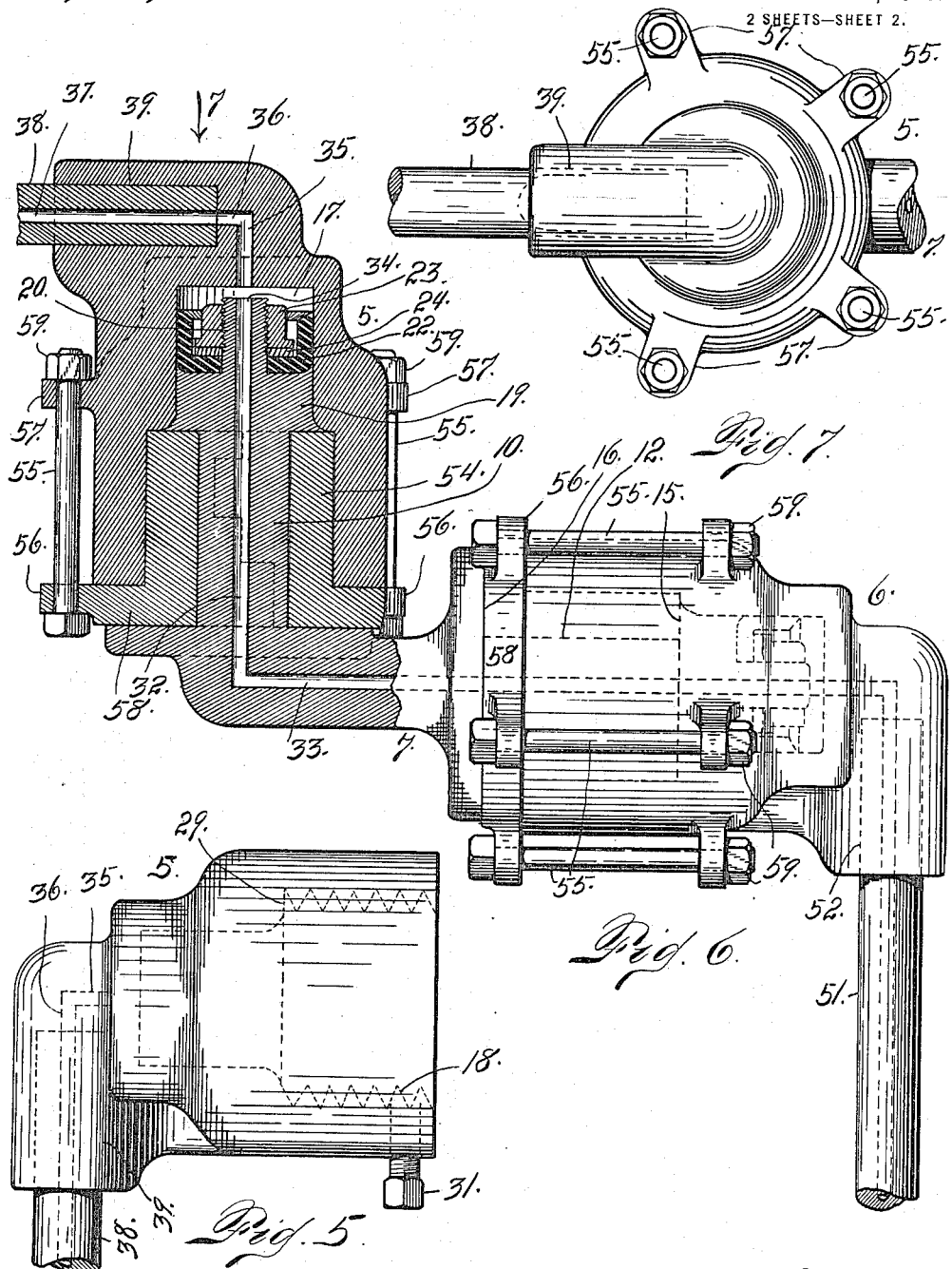

DAVY VANCE SICKMAN, OF DENVER, COLORADO.

FLEXIBLE JOINT FOR PIPES.

1,284,159.                    Specification of Letters Patent.      Patented Nov. 5, 1918.

Application filed November 9, 1914. Serial No. 870,949.

*To all whom it may concern:*

Be it known that I, DAVY VANCE SICKMAN, a citizen of the United States, residing at the city and county of Denver and State of Colorado, have invented certain new and useful Improvements in Flexible Joints for Pipes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in flexible joints for pipes, and while more especially adapted for use in handling fluids where high pressure is required, it may, of course, be employed in other relations. It is particularly well adapted for employment in delivering water to hydraulic cartridges for breaking down material, as coal, in mines. In this art, exceedingly high pressures are necessary. My improved joint is of such character that it is capable of movement through 360 degrees in planes at right angles or perpendicular to each other. The joint is also of such character that, when the fluid is not passing therethrough, it is capable of easy adjustment, the parts being readily movable upon each other. As soon as the fluid is turned into the joint, a portion of it acts upon a gasket of the joint to render the latter fluid tight, thus stiffening the joint and maintaining the latter sufficiently rigid for the purpose. In my improvement, two elbow members or casings are employed, the corresponding parts of these members having their axes at right angles to each other, the said members being joined by a coupling having integral cores also extending at right angles to each other.

Having briefly outlined my improvement, I will proceed to describe the same in detail, reference being made to the accompanying drawing, in which is illustrated an embodiment thereof. In this drawing,—

Figure 1 is a longitudinal section taken through my improved joint, portions of the device, however, being shown in elevation.

Fig. 2 is an elevation partly in section of the coupling member, including two cores formed integral therewith and arranged at right angles to each other.

Fig. 3 is a detail view of a two-part nut, the parts being separated for clearness of illustration.

Fig. 4 is a section taken through a portion of the device on the line 4—4, Fig. 1, showing a special construction of washer.

Fig. 5 is an elevation of one of the elbow members or casings of the joint shown in Fig. 1.

Fig. 6 is a view partly in elevation and partly in section showing a modified form of my improvement.

Fig. 7 is an elevation looking in the direction of arrow 7, Fig. 6.

The same reference characters indicate the same parts in all the views.

Referring first more particularly to Figs. 1 to 5, inclusive, of the drawing, let the numerals 5 and 6 designate two elbow shaped casings so arranged that their axes are at right angles to each other. These two members are connected by means of a coupling 7 including two core pieces 8 and 9 extending at right angles to each other. These core pieces are provided with spindle members 10 and 12, respectively. The spindle member 10 is arranged between two shoulders 13 and 14 while the spindle member 12 is arranged between two similar shoulders 15 and 16.

The elbow member or casing 5 is bored to form a cavity consisting of an inner part 17 and an outer enlarged part 18, and adapted to receive the core member 8 of the coupling. Beyond the spindle member 10 the free extremity of the core 8 is enlarged as shown at 19 and provided with a reduced threaded portion 20. The shoulder 21 surrounding the part 20 is engaged by a cup leather 22 which is held in place by means of a nut 23 screwed upon the part 20 and a washer 24 engaging the cup leather and located between the latter and the nut. The wall surrounding the opening in this washer is formed straight on one side, as shown at 25, to fit a part of corresponding shape formed on the part 20 of the core, whereby the washer is caused to turn with the core when adjusting the joint.

In order to connect the core 8 with the elbow member 5 and introduce the core to the cavity of said member, a nut 26 is first applied to the spindle part 10 of the core between the shoulders 13 and 14. In order that it may be practicable to apply the nut, the latter is divided into two parts and the division is preferably made upon an irregular or zigzag line or on a series of planes, those adjacent or contiguous being out of alinement with each other. By virtue of this construction, the two parts of the nut when brought into engagement or coöperative relation with each other, are prevented from moving independently of each other in the direction of the axis of the nut. After this nut is applied to the spindle member 10 of the core 8, the inner extremity of the nut is brought into engagement with the portion 18 of the cavity of the elbow member 5, which is threaded to receive or fit the exterior threads 27 of the nut. Then, by applying a wrench to the outer polygonal part 28 of the nut, which is exposed for the purpose, the core 8 may be forced into the cavity of the elbow member 5, as the nut enters the threaded portion 18 of the cavity. By the time the inner extremity of the nut is brought into engagement with the interior shoulder 29 of the elbow member 5, the core will have been forced into the cavity of the elbow and brought into coöperative relation therewith, and the outer polygonal shaped part 28 of the nut will have been brought into engagement with the adjacent extremity 30 of the elbow member 5. Then, by applying a set screw 31 to the elbow member 5 and by inserting the same in a threaded opening extending at right angles with the axis of the elbow member, the nut 26 may be locked to the elbow member 5, whereby the elbow member and the nut may be turned upon the core 8 of the coupling.

The coupling 7 of my improved joint is provided with a passage extending centrally therethrough, the said passage being composed of two portions, respectively designated by the numerals 32 and 33, the said parts of the passage or orifice being arranged at right angles to each other. The inner extremity 34 of the portion 32 of the passage communicates with the inner portion of the cavity part 17 of the elbow member 5, whereby, fluid passing through the joint is free to enter the cavity part 17 and come in contact with the cup leather 22, whereby a tight joint is formed. Beyond the cavity part 17 the elbow member 5 is provided with a passage composed of parts 35 and 36 arranged at right angles to each other, the part 36 registering with a passage 37 formed in a pipe member 38, which is inserted in an opening 39 formed in the elbow member and extending at right angles to the cavity in which the core 8 is passed.

The core 9 is connected with the elbow member 6 in substantially the same manner as heretofore described when explaining the connection between the core 8 and the member 5. That is to say, a two part nut 26 is applied to the spindle part 12 of the core and screwed into a threaded recess or cavity 40 formed in the member 6, the reduced inner extremity 41 of the core being forced into a cavity part 42 of smaller size than the part 40. This part 41 of the core 9 is provided with a reduced threaded extremity 43 to which is applied a cup leather 44 held in place by a nut 45 and a washer 46, the wall surrounding the opening in the washer being flat on one side to correspond with the shape of the adjacent part of the threaded extremity 43 of the core. When the inner part 41 of the core is forced into the cavity part 43 of the member 6, the cup leather will form a fluid tight joint when fluid under pressure is being passed through the joint. The passage 33 formed in the core 9, communicates at its outer extremity 47 with the inner part of the cavity 43, whereby fluid under pressure will act upon the cup leather to form a fluid tight joint. Beyond the inner extremity of the cavity 42, the elbow member 6 is provided with a passage composed of two parts 48 and 49 arranged at right angles to each other, the part 48 being in communication with the cavity 42 and the part 49 at its outer extremity registering with a passage 50 formed in a pipe 51 which is inserted in a recess 52 formed in the elbow member 6.

Hence, it will be understood that a joint of this character is readily adjustable so that either of the pipe members 38 or 51 may be turned to occupy any direction within a complete circumference during the turning movement of the pipe 38 or 51, as the case may be, whereby, as the casing or elbow member 5 or 6 is moved, the movement of the elbow member will be upon the core 8 or 9 of the joint, as heretofore explained. It will be understood that the nut 26 which is threaded into the elbow member 6, is secured in place and locked upon the same member by means of a set screw 53.

Instead of using the form of construction illustrated in Fig. 1, which involves the use of the nuts 26 for connecting the cores 8 and 9 of the coupling member 7 with the elbow members 5 and 6, a two part sleeve 54 may be used and connecting each elbow member by means of bolts 55, which pass through lugs 56 and 57 formed upon the elbow members, and the enlarged or shouldered parts 58 of the sleeves (see Fig. 6). As soon as the sleeve is applied to either of the core members, the core, together with the sleeve, may be moved into the corresponding cavity of the elbow member and tightly secured in coöperative relation therewith by applying fastening nuts 59 to the threaded extremities of the bolts. In other respects, the construction shown in Fig. 6 is precisely as that described in Figs. 1 and 2 of the drawing.

From the foregoing description, it will be understood that my improvement is of great utility where it is employed in connection with pipe sections 38 and 51, since by using a suitable number of these joints, the sections of pipe employed therewith may be folded into comparatively small compass, whereby they may be readily transported from place to place, which is an important advantage when employed for the purpose of introducing water under pressure where hydraulic cartridges are employed in mines, since, under such circumstances, the handling of long sections of pipe of such construction as to resist the great pressure which is necessarily employed, is very awkward and exceedingly inconvenient.

Attention is again called to the fact that when fluid is not passing through the joint, there consequently being no pressure within the cavity parts 17 and 42 to cause the parts of the joint to tightly engage each other, the said parts may be easily moved for the purpose of effecting any of the adjustments heretofore explained, that is, whereby either of the members 5 or 6 and its casings as just explained, may be moved through two complete circles perpendicular to each other.

Having thus described my invention, what I claim is,—

1. A flexible joint including a casing having a cavity composed of bores of two diameters, a core located in said cavity and whose inner extremity engages the smaller bore and is provided with a reduced threaded portion, a gasket applied to said threaded portion surrounding the same and engaging a shoulder of the core at the base of the threaded portion, a nut threaded on the core and engaging the gasket, the outer portion of the core passing through the larger bore of the cavity and having a spindle member located between two shoulders, a sleeve applied to the spindle member, engaging the larger bore of the cavity and fitting between the said shoulders, said sleeve being enlarged at its outer extremity to form a collar which spaces the adjacent extremity of the casing from the outer shoulder of the core, and means for securing the sleeve in place in the casing, the joint having an orifice which is continued longitudinally through the core, the orifices of the core and casing being positioned for constant registration, the inner extremity of the cavity in the casing being in communication with the orifice to permit fluid passing through the joint to enter this portion of the cavity.

2. A joint including a casing member having a cavity composed of bores of two diameters, a core located in said cavity, the casing and core having communicating orifices positioned for constant registration, the inner extremity of the core entering the smaller bore of the cavity and being equipped with a gasket, this portion of the cavity being in communication with the orifices of the joint, the outer portion of the core passing through the larger bore of the casing and being composed of a spindle member located between two shoulders, and a two part sleeve applied to the spindle member, engaging the said larger bore of the casing and fitting between the two shoulders, and means for locking the sleeve to the casing.

3. A joint including a body member having a cavity composed of bores of two diameters, a core located in said cavity, the two parts having communicating orifices positioned for constant registration, the inner portion of the core engaging the smaller bore portion of the casing and having a reduced threaded portion, a gasket surrounding this portion of the core and secured thereto, the portion of the cavity where the gasket is located being in communication with the orifices of the joint, the outer portion of the core passing through the larger bore of the cavity and consisting of a spindle member located between two exterior shoulders, one of which is formed on the inner portion of the core, and a two-part sleeve applied to the spindle member of the core and rigidly secured to the body member, the joint having a coupling shank extending beyond the body member and containing an orifice in communication with the orifices of the body member and the core.

4. A joint including a coupling composed of two cores whose axes extend at right angles to each other, each core having a spindle member located between two exterior shoulders, the said coupling having an orifice extending therethrough, a two-part sleeve applied to each spindle member and fitting between the two shoulders, and two casings each having a cavity formed of two bores of different diameters, the inner extremity of each core entering the smaller bore of the corresponding cavity and having a gasket secured to form a tight joint under fluid pressure, the spindle member of each core passing through the larger bore of the cavity and the sleeve mounted thereon engaging said bore, the said casings having orifices communicating with the orifices of the coupling.

5. A joint including a coupling composed of two cores whose axes extend at right angles to each other, each core having a spindle member located between two exterior shoulders, the said coupling having an orifice extending therethrough, a two-part sleeve applied to each spindle member and fitting between the two shoulders, two casings each having a cavity formed of two bores of different diameters, the inner extremity of each core entering the smaller bore of the corresponding cavity and having a gasket secured to form a tight joint under fluid pressure, the spindle member of each core passing through the larger bore of the cavity and the sleeve mounted thereon engaging said bore, the said casings having orifices communicating with the orifices of the coupling, and pipes connected with the respective casing members and extending at right angles to the cores, the said pipes having orifices communicating with the orifices of the joint.

6. A flexible joint including a casing having a cavity, a core located in said cavity and whose inner extremity enters the inner portion of the cavity, a gasket applied to the inner extremity of the core, the outer portion of the core having a spindle member located between two shoulders, a sleeve applied to the spindle member and fitting between the said shoulders, the said sleeve being enlarged at its outer extremity to form a collar which separates the adjacent extremity of the casing from the outer shoulder of the core, and means for securing the sleeve in place in the casing, the joint having an orifice which is continued longitudinally through the core, the orifice in the core being arranged to permit independent rotation of the core or casing without interrupting the communication between the orifices of the core and casing.

7. A joint including a casing having a cavity, a core located in said cavity, the casing and core having communicating orifices, the inner extremity of the core being equipped with a gasket, said portion of the core being in communication with the orifices of the joint to permit the entrance of fluid for the purpose of forming a tight joint, the outer portion of the core having a spindle member located between two shoulders and a two-part sleeve applied to the spindle member and fitting between the shoulders, and means for locking the sleeve to the casing.

8. A joint including a body member having a cavity, a core entering said cavity, the two parts having communicating orifices, the inner portion of the core having a gasket, the portion of the cavity where the gasket is located being in communication with the orifices of the joint, the outer portion of the core consisting of a spindle member located between two shoulders, a two-part sleeve applied to the spindle member of the core and rigidly secured to the body member, the joint having a coupling shank extending beyond the body member and containing an orifice in communication with the orifices of the body member and the core.

9. A joint including a coupling composed of two cores whose axes extend at right angles to each other, each core having a spindle member located between two shoulders, the said coupling having an orifice extending therethrough, a two-part sleeve applied to each spindle member and fitting between the two shoulders, two casings, each having a cavity which the respective cores of the coupling enter, the said casings having orifices communicating with the orifices of the coupling, and means for rigidly connecting the said sleeves with the respective casings, each sleeve having an outer enlargement located between the outer shoulder of the coupling and the adjacent casing member.

In testimony whereof I affix my signature in presence of two witnesses.

DAVY VANCE SICKMAN.

Witnesses:
MAZE KIRBY,
A. EBERT O'BRIEN.